Dec. 4, 1934.  J. M. MONTGOMERY  1,983,093
AUTOMATIC MEASURING MECHANISM
Filed April 28, 1934   2 Sheets-Sheet 1
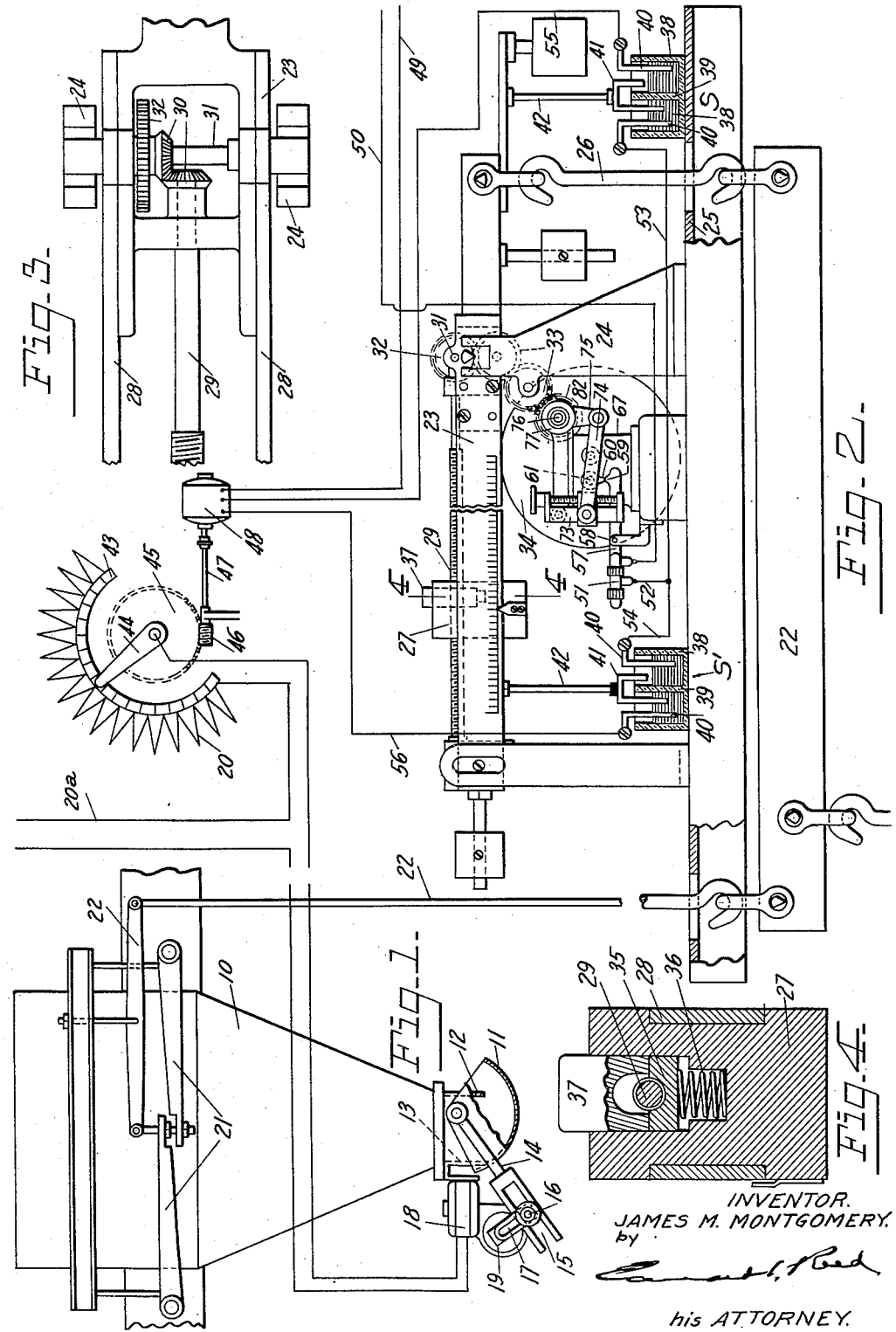
INVENTOR.
JAMES M. MONTGOMERY.
by
his ATTORNEY.

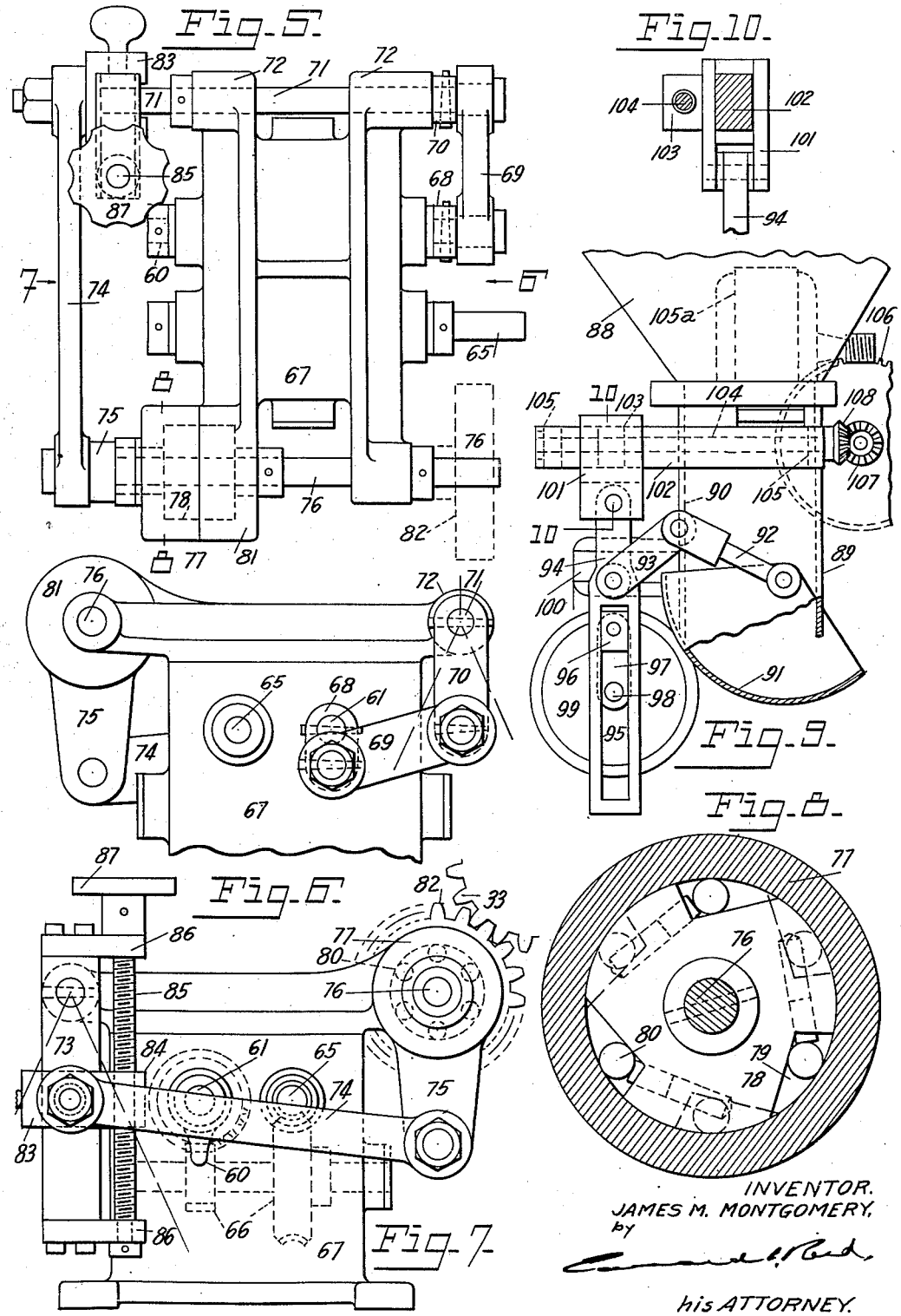

Patented Dec. 4, 1934

1,983,093

UNITED STATES PATENT OFFICE 1,983,093

AUTOMATIC MEASURING MECHANISM

James M. Montgomery, Piqua, Ohio

Application April 28, 1934, Serial No. 722,914

34 Claims. (Cl. 221—118)

This invention relates to an automatic measuring mechanism and is designed primarily to deliver predetermined quantities of material to a point at which it is to be used, as the delivery of lime to water in a water treating system.

One object of the invention is to provide such a mechanism which will measure the material delivered according to weight and in which the delivery will be automatically controlled.

A further object of the invention is to provide such a mechanism in which the rate of delivery will be controlled by the automatic adjustment of the counterbalance of the weighing mechanism.

A further object of the invention is to provide such a mechanism in which the rate of delivery will not be influenced by the material adhering to or partially clogging the mouth of the hopper.

A further object of the invention is to provide such a mechanism which will not only deliver predetermined quantities of material during each successive period of time but will maintain a uniform rate of delivery throughout each period.

Other objects of the invention will appear as the mechanism is described in detail.

In the accompanying drawings Fig. 1 is a side elevation, partly in section, of a hopper and its discharge conduits forming part of the invention; Fig. 2 is a side elevation, partly in section, of the controlling device; Fig. 3 is a plan view of a portion of the beam of the weighing mechanism; Fig. 4 is a sectional detail of the poise taken on the line 4—4 of Fig. 2; Fig. 5 is a plan view of the motor operated actuating device for the poise; Fig. 6 is an elevation of one side of the actuating device, partly broken away; Fig. 7 is an elevation of the other side of the actuating device; Fig. 8 is a detail view of the clutch; Fig. 9 is a side elevation, partly in section, of a modified form of mechanism for operating the discharge gate of the hopper, partly broken away; and Fig. 10 is a section taken on the line 10—10 of Fig. 9.

In these drawings I have illustrated one embodiment of my invention, together with a modification of a portion thereof, but it will be understood that this particular embodiment has been chosen for the purpose of illustration only and that the mechanism may take various forms without departing from the spirit of the invention.

In the particular embodiment here illustrated the material to be delivered is deposited in a container 10, here shown as a hopper having at its lower end a discharge mouth provided with a delivery device which is automatically controlled. As here shown, the delivery device is in the form of a radial gate 11, pivotally mounted on the lower end of the hopper and so arranged that in all positions it will be located beneath the mouth of the hopper. The gate is of such length that when in one position the forward edge thereof will extend some distance beyond the front wall 12 of the hopper and when it is retracted or moved to its other position the forward edge thereof will not be retracted beyond the front wall of the mouth of the hopper. The rear wall 13 of the mouth of the hopper is of such length that the lower edge thereof will at all times be arranged close to or in engagement with the bottom wall of the gate. The front wall 12 of the hopper mouth is of less length so as to provide a space between the lower edge thereof and the gate in all positions of the latter. It will be apparent therefore that the material in the hopper will move by gravity through the mouth until its movement is checked by contact with the gate. When the gate has been moved to the left, in Fig. 1, to the limit of its movement, the material will have accumulated on the forward portion thereof and when the gate is then moved to the right, to the position shown in Fig. 1, a portion of the material on the gate will be carried beyond the front wall of the mouth of the hopper and other material will move onto the rear portion of the gate, so that when the gate is again moved toward the left the rear wall of the mouth will prevent the material on the gate from moving rearwardly with the gate and consequently the material on the forward portion of the gate will be forced over the edge thereof and will drop to a suitable point of discharge, such as a receptacle or conveyor.

Oscillatory movement may be imparted to the gate in any suitable manner and by varying the extent or the speed of movement of the gate its operation may be so regulated as to control the amount of material delivered and the rate of delivery. In that form of the apparatus shown in Fig. 1 the rate of delivery is controlled by varying the speed at which the gate is operated, while Fig. 9 shows a form of apparatus in which the rate of delivery is controlled by varying the extent of movement imparted to the gate.

In the construction illustrated in Fig. 1 a rock arm 14 is rigidly connected at one end with the gate and has its other or free end slotted, as shown at 15, to receive the wrist pin 16 of a crank arm 17. This crank arm is connected with an electric motor 18 through reducing gearing, not here shown but contained within the casing 19. The speed at which the gate is operated by the motor may be varied in any suitable manner but, in the present instance, the motor is a variable speed motor and its speed of operation is controlled by varying the amount of current supplied thereto, this being preferably accomplished by means of a rheostat 20, interposed in one side of the power line 20a.

The hopper 10 is supported by weigh arms 21 which are connected through the usual or any suitable lever system 22 with a controlling mechanism which preferably comprises a pivoted member and adjustable means for controlling the movements thereof. Preferably this controlling member is in the nature of a weigh beam 23 which is pivotally mounted between its ends on upright standards 24 carried by a base or floor 25. The shorter end of the beam is connected with the lever system 22, as by means of a link 26. The opposite or longer end of the beam is provided with suitable means for counterbalancing the same, which may conveniently comprise a poise 27. In the construction illustrated the beam comprises parallel side members 28 and the poise is arranged between and slidably mounted upon these side members. The poise is provided with suitable means for adjusting the same lengthwise of the beam and, as here shown, this means comprises a screw shaft 29 which extends lengthwise of the beam and is rotatably supported thereon, the forward end of the shaft being screw threaded and extending through an opening in the poise which is provided with screw threads to engage the screw threaded portion of the shaft. The screw shaft 29 is connected by beveled pinions 30 with a shaft 31 which is journaled on the beam above the axis of the latter, and rigidly secured to this shaft is a gear 32, the pitch line of which intersects the axis of the beam. This gear is connected by a gear train 33 with suitable driving mechanism which is of such a character as to impart the desired movement to the poise. In the present instance it comprises a small electric motor 34.

In order that the poise may be manually adjusted independently of the screw shaft, the screw threaded portion of the same is in the nature of a half nut 35 slidably mounted in the poise and acted upon by a spring 36 which tends to hold the same normally in screw threaded engagement with the screw shaft 29. Slidably mounted in the poise is a plunger 37 the lower portion of which is bifurcated and straddles the shaft 29 and rests upon the half nut 35 on opposite sides of the shaft. By depressing the plunger 37 the half nut will be moved out of engagement with the screw and the poise may be shifted with relation to the latter.

When the desired quantity of material has been deposited in the hopper 10 the poise 27 is manually adjusted on the beam, to properly balance the load in the hopper, and the means for actuating the hopper discharge device and the poise are set in operation. The poise will be moved toward the axis of the beam at a predetermined rate of movement which may be either intermittent or continuous and which controls the operation of the discharge device. If the material is discharged from the hopper at a rate greater than the rate at which the poise is moved the load on the beam will be so decreased that the latter will be tilted by the poise. On the other hand if the material is discharged from the hopper at a rate less than the rate at which the poise is moved the beam will be tilted in the opposite direction against the action of the poise, and this tilting movement of the beam will control means which in turn controls the action of the radial gate of the discharge device.

When, as in the present instance, the controlling means for the gate is electrically controlled, switches may be provided in circuit with that controlling means and so arranged that when the beam tilts in one direction a switch will be closed to cause the action of the gate to increase the delivery of material and when the beam tilts in the other direction a switch will be closed to cause the action of the gate to decrease the delivery of material. When the rate of delivery is controlled by a variable speed motor, as shown in Fig. 1, the switches may be connected with operating mechanism for the rheostat which controls the operation of that motor. These switches may be of any suitable character but I prefer to employ electrolitic switches S and S' as these offer no appreciable resistance to the movement of the beam. As here illustrated both switches are identical in construction and each comprises a receptacle 38 of insulating material which is divided by a partition 39 into two chambers each of which contains a conducting liquid. In each chamber is mounted a stationary electrode 40, the lower end of which is immersed in the liquid. The movable member of the switch is preferably in the form of a substantially U-shaped electrode 41 which is connected with, and is preferably rigidly secured to, the adjacent end of the beam, in the present instance by a rod 42. At least one arm of the U-shaped electrode is of such length that when the beam is in balance this arm will be elevated above the liquid in the receptacle and the circuit between the two stationary electrodes 40 will be interrupted. If the adjacent end of the beam moves downwardly both arms of the movable electrode will be immersed in the liquid and the circuit completed. I prefer that one arm of the U-shaped electrode shall be of such length that it will be normally immersed in the liquid in the receptacle, the other arm being of such length that it will be moved into and out of the liquid by the movements of the beam. Obviously when the beam is in balance both switches will be open and both switches cannot be closed at the same time.

In the arrangement here illustrated the rheostat 20 which controls the operation of the variable speed motor 18 comprises an arcuate series of contacts or terminals 43 over which moves one end of a radial contact arm 44 rigidly connected with a worm gear 45. The worm gear 45 meshes with a worm 46 on the shaft 47 which is connected with a reversible electric motor 48. The direction of operation of the reversible motor 48 is controlled by the electrolitic switches S and S'. The reversible motor is connected with a suitable power line, one conductor 49 of which is directly connected with the motor. A second conductor 50 of the power line is connected with both switches S and S', this connection being in the present instance established through an intermittent switch 51 which will be hereafter described. The conductor 50 is connected with one terminal of the switch 51 and the other terminal of that switch is connected by conductors 52 and 53 with one of the stationary electrodes in the switch S and is also connected by the conductor 52 and the conductor 54 with one of the stationary electrodes in the switch S'. The second stationary electrode in the switch S is connected by a conductor 55 with the motor 48 and the second stationary electrode of the switch S' is connected by a conductor 56 with the motor 48. It will be apparent therefore that when the beam is in balance and both switches S and S' are open the motor 48 will not operate and that when the beam becomes unbalanced the motor will operate in a direction determined by which of the switches S and S' is closed by the action of the beam.

It is desirable that a limited movement only should be imparted to the rheostat upon the closing of the switch S or S' and the intermittent switch 51 is provided for this purpose. As here shown, it is a mercury tube switch and is mounted on one end of a lever 57 pivotally mounted between its ends on a bracket 58 and means are provided for actuating the lever 57 to intermittently tilt the switch from its open to its closed position and vice versa. The means for tilting the switch 51 may be of any suitable character but preferably it is actuated from the motor 34 which drives the poise and, as here shown, the lever 58 has, on that side of its axis opposite the switch 51, a projection or nose 59 arranged to be engaged by a projection or wiper cam 60 carried by a shaft 61, which is driven from the motor 34. The switch 51 is so arranged that when released by the cam it will automatically move to its open position, this being accomplished in the present instance by gravity. The cam may be rotated at any suitable speed, for example, it may make one complete rotation in thirty seconds, and the shape of the cam determines the length of time that the switch will be closed, say three seconds. With such an arrangement the switch will be closed for three seconds out of each thirty seconds.

Any suitable mechanism may be interposed between the motor 34 and the screw shaft 29 to cause the latter to impart the desired movement to the poise. Preferably the poise is intermittently operated to move the same predetermined distances at regular intervals and it is desirable that means should be provided for varying the amount of movement imparted to the poise upon each operation thereof. As here shown, the motor 34 is connected with the high speed shaft 65 of a speed reducing mechanism 66 mounted in a casing 67. The low speed shaft of this reducing mechanism, which is the shaft 61, projects beyond one side of the casing and has rigidly secured thereto a crank arm 68 which is connected by a link 69 with a crank arm 70 rigidly secured to a shaft 71 mounted in suitable bearings 72 carried by the upper part of the casing 67. The shaft 71 etxends across the casing and projects beyond the opposite side thereof and rigidly secured to this projecting end of the shaft is an arm 73 which, in the present instance, extends downwardly along the edge of the casing. The arm 73 is connected by a link 74 with a crank arm 75 which is loosely mounted on a shaft 76 rotatably mounted on the casing at that end thereof opposite the shaft 71. The crank arm 75 is connected with the shaft 76 through a one-way clutch, preferably of the ball type. As here shown, this clutch comprises a cylindrical casing 77 which is formed integral with the crank arm 75. Mounted within the casing 77 and rigidly secured to the shaft 76, is a clutch member 78 having a series of tapered recesses 79 to receive the balls 80. This clutch operates in a well known manner to cause it to clutch the crank arm to the shaft when the crank arm moves in one direction and to permit the crank arm to move in the other direction with relation to the shaft. A suitable detent is also provided to hold the shaft against reverse movement and, in the present instance, this detent is similar in construction to the clutch but its casing 81 is rigidly secured to the main casing 67 and the tapered recesses are arranged in reverse relation to the recesses of the clutch, so that when the crank arm is clutched to the shaft the latter can move with relation to the detent but when the crank arm is disconnected from the shaft the latter is held against reverse movement. Rigidly secured to the shaft 76 is a gear 82 which forms a part of the gear train 33 which connects the actuating device with the screw shaft 29. It will be apparent therefore that the motor will operate through the crank 68 and the shaft 71 to impart oscillatory movement to the pivoted arm 73 and that this movement will be transmitted through the link 74 to the crank arm 75 and that the movement of this crank arm in one direction will impart rotatory movement to the gear 82 and to the screw shaft but that the gear and screw shaft will be held against reverse movement when the crank arm moves in the other direction, thereby causing a step by step movement to be imparted to the poise, and inasmuch as the motor 34 is a constant speed motor the poise will be advanced predetermined distances at regular intervals. For the purpose of varying the amount of movement so imparted to the poise upon each oscillation of the pivoted arm 73 I have provided means for adjusting the point of connection of the link 74 with the pivoted arm 73 toward and from the axis of that arm. As here shown, the link is pivotally connected with a slide block 83 which is slidably mounted on the arm 73 and which has a laterally extending portion 84 provided with screw threads and constituting a nut to receive an adjusting screw 85 which is rotatably mounted in bearings 86 at the upper and lower ends of the arm 73 and which is provided with a hand wheel 87 for rotating the same. The screw 85 being held against axial movement in its bearings it will be apparent that the rotation thereof will shift the slide block 83 and the connected end of the link 74 toward or from the axis of the arm 73, that is, the shaft 71, thereby varying the length of movement imparted to the link 74 by the pivoted arm.

In the operation of the mechanism, after the hopper has been filled, the beam balanced and the motors 18 and 34 started in operation, the discharge gate 11 will oscillate at a uniform speed to discharge predetermined quantities of material, and so long as the material is discharged at the same rate that the counterbalancing means of the controlling device is moved the rate of movement of the gate will remain uniform. If the rate of discharge of material exceeds the rate of movement of the poise the load on the beam will be reduced and the poise will tilt the beam in a direction to close the switch S', thereby closing the circuit through the reversible motor 48 in a direction to cause the rheostat to connect additional resistance in the circuit for the variable speed motor 18, thereby slowing down the operation of that motor. The intermittent switch 51 will close the circuit for the motor 48 for a brief interval, and then open that circuit, and, of course, the worm gear drive for the rheostat greatly reduces the speed of its operation. Consequently the motor will be operated for a brief interval only and the rheostat arm moved a correspondingly short distance and then stopped for an interval sufficient to permit the mechanism to accommodate itself to the changed conditions. If the change in the rate of discharge has not been sufficient to bring the beam to a balance the rheostat will be further adjusted upon the next closing of the intermittent switch 51 and eventually the rate of discharge will become such as to maintain the beam in balance. If the material is discharged from the hopper at a rate less than the rate at which the poise is moved the load on the beam will tilt the same in a direction to close the switch S, thus closing the circuit through the motor 48 in a direction to cut out resistance from the circuit for the variable speed motor 18 and thus speed up the operation of that motor and increase the rate of delivery of material. The operation of the rheostat is intermittent under the control of the switch in the same manner as above described.

As has been heretofore stated the rate of discharge of material from the hopper may be varied either by varying the speed at which the gate is operated or by varying the amount of movement imparted to the gate on each operation thereof. In Fig. 9 I have shown a form of apparatus in which the rate of delivery is controlled by varying the length of movement of the gate. As there shown, the apparatus comprises a hopper 88, the discharge mouth of which has front and rear walls 89 and 90 and is provided at its lower end with a radial gate 91 pivotally mounted on the mouth of the hopper and provided with a rock arm 92 for actuating the same, this construction being substantially similar to that above described. In the present instance, however, the rock arm 92 which actuates the gate is connected by a link 93 with a pivoted member or second rock arm 94 which is pivotally mounted upon a normally stationary but adjustable support adjacent to the mouth of the hopper. This second rock arm has a longitudinal slot 95 in which is slidably mounted a block 96 carried by the free end of a crank arm 97 which is connected with the shaft 98 of a speed reducing mechanism, not here shown, but enclosed in a casing 99, and this speed reducing mechanism is driven by a constant speed motor 100. It will be apparent that the rotation of the shaft 98 and crank arm 97 will impart pivotal movement to the rock arm 94 and that this movement will be imparted through the link 93 to the rock arm 92 of the gate. It will also be apparent that by varying the angular relation of the rock arm 92 and the link 93 the amount of movement imparted to the gate upon each oscillation of the second rock arm 94 may be varied, the sharper the angle between the rock arm 92 and the link 93 the smaller the amount of movement which will be imparted to the gate. In order to vary the angular relation of the link and the rock arm and thus vary the action of the gate the second rock arm 94 is pivotally mounted on a carrier or block 101 which is slidably mounted on a bar or track 102 rigidly secured to and projecting beyond one side of the mouth of the hopper. The carrier 101 has at one side thereof a projection 103 having a threaded opening adapted to receive a screw 104 which is rotatably mounted in suitable bearings 105 on the bar 102, whereby the rotation of the screw will move the carrier lengthwise of the bar and thus adjust the axis of the second rock arm 94 with relation to the axis of the gate, thereby varying the angle between the link 93 and the rock arm 92. The adjustment of the axis of the rock arm 94 is preferably controlled by the same mechanism that controls the rheostat for the variable speed motor of Fig. 1, and I have shown a reversible motor 105a similar to the motor 48, as connected through reducing mechanism 106, with a shaft 107 which in turn is connected through beveled gears 108 with the screw 104. Consequently the operation of the motor 105a will be initiated and the direction of its operation controlled by the beam 23 and the operation of the motor will cause the carrier 101 to be moved in one direction or the other, thereby automatically controlling the extent of movement of the gate in accordance with the amount of material being delivered.

While I have shown and described one embodiment of my invention, together with a modification thereof, I wish it to be understood that I do not desire to be limited to the details thereof as various modifications may occur to a person skilled in the art.

Having now fully described my invention, what I claim as new and desire to secure by Letters Patent, is:

1. In an apparatus of the character described, a material delivering device having an operable part to control the delivery of material thereby, means to actuate said operable part, a movable member, means to actuate said movable member in accordance with the quantity of material delivered by said delivering device, adjustable means to regulate the movement of said movable member, separate means for actuating said adjustable means, and means controlled by said movable member for controlling the operation of said operable part of said delivering device by its actuating means.

2. In an apparatus of the character described, a material delivering device having an operable part to control the delivery of material thereby, means to actuate said operable part, a pivoted member, means for actuating said pivoted member in accordance with the quantity of material delivered by said delivering device, separately operated means to control the movement of said pivoted member, and means controlled by said pivoted member to control the operation of said operable part of said delivering device by its actuating means.

3. In an apparatus of the character described, a material delivering device having an operable part to control the delivery of material thereby, means for actuating said operable part, a pivoted member, means to actuate said pivoted member in accordance with the quantity of material delivered by said delivering device, a second member connected with said pivoted member and adjustable with relation thereto to control the movement of said pivoted member, separate means for adjusting said second member, and means controlled by said pivoted member to control the operation of said operable part by said actuating device.

4. In an apparatus of the character described, a material delivering device, power operated means to cause the delivery of material by said delivering device, a movable member, means controlled by said movable member to control said power operated means, means to actuate said movable member in accordance with the quantity of material delivered to said delivering device, and separately operated means to control the movement of said movable member by said actuating means.

5. In an apparatus of the character described, a material delivering device, power operated means to cause the delivery of material by said delivering device, a pivoted member, means controlled by said pivoted member to control said power operated means, means to actuate said pivoted member in accordance with the quantity of material delivered by said delivering device, a balancing device to control the movement of said pivoted member by said actuating means, and separate means for actuating said balancing device.

6. In an apparatus of the character described, a material delivering device, power operated means to cause the delivery of material by said delivering device, a member pivotally mounted between its ends, means acting on one end of said member to actuate the same in accordance with the quantity of material delivered by said delivering device, adjustable means acting on the other end of said member to counterbalance the same, separate means to adjust said counterbalancing means, and means controlled by said pivoted member to control said power operated means.

7. In an apparatus of the character described, weighing mechanism comprising a beam and an adjustable counterbalance therefor, a container supported by said weighing mechanism, an operable device to control the discharge of material from said container, means separate from said weighing mechanism to adjust said counterbalance, and means controlled by the movement of said beam for actuating the operable device which controls the discharge of material from said container.

8. In an apparatus of the character described, weighing mechanism comprising a beam and an adjustable counterbalance therefor, a container supported by said weighing mechanism, an operable device to control the discharge of material from said container, power operated means for actuating said operable device, means separate from said weighing mechanism to adjust said counterbalance, and means controlled by the movement of said beam to control the operation of said operable device by said actuating means.

9. In an apparatus of the character described, weighing mechanism comprising a beam and a poise supported by said beam for movement lengthwise thereof, a container supported by said weighing mechanism, an operable device to control the discharge of material from said container, power operated means for actuating said operable device, means separate from said weighing mechanism to actuate said poise, and means controlled by the movement of said beam to control the operation of said operable device by said actuating means.

10. In an apparatus of the character described, weighing mechanism comprising a beam and an adjustable counterbalance therefore, a container supported by said weighing mecha- nism, an operable device to control the discharge of material from said container, an electric motor to actuate said operable device, means separate from said weighing mechanism to adjust said counterbalance, and means including a switch actuated by said beam for controlling the flow of current to said motor.

11. In an apparatus of the character described, a material delivering device having an operable part to control the delivery of material thereby, means for actuating said operable part, means for varying the speed at which said operable part is actuated by said actuating means, a movable member, means for actuating said movable member in accordance with the quantity of material delivered by said delivering device, a second member movable with relation to said movable member, separate means for actuating said second movable member, and means controlled jointly by said movable members for controlling the operation of said speed varying means.

12. In an apparatus of the character described, a material delivering device having an operable part to control the delivery of material thereby, means for actuating said operable part, means for varying the speed at which said operable part is actuated by said actuating member, a pivoted member, means for actuating said pivoted member in accordance with the quantity of material delivered to said delivering device, a second member supported by said pivoted member and adjustable with relation thereto to regulate the movement of said pivoted member, separate means for adjusting said second member, and means controlled by the movement of said pivoted member to control the operation of said speed varying means.

13. In an apparatus of the character described, a material delivering device, power operated means to cause the delivery of material by said delivering device in varying quantities, a movable member, means for actuating said movable member in accordance with the quantity of material delivered by said delivering device, separately operated means to control the movement of said movable member by said actuating means, and means controlled by said movable member and acting on said power operated means to control the quantity of material delivered by said delivering device.

14. In an apparatus of the character described, a material delivering device, a motor, means actuated by said motor to control the delivery of material by said delivering device, means to control the speed at which said delivery controlling means is actuated by said motor, a movable member, means controlled by said movable member to actuate said speed controlling means, means to actuate said movable member in accordance with the quantity of material delivered by said delivering device, and means operated independently of the quantity of material delivered to control the operation of said movable member by its actuating means.

15. In an apparatus of the character described, a material delivering device, a motor, means actuated by said motor to control the delivery of material by said delivering device, a device operable in either of two directions to control the speed at which the delivery controlling means is actuated by said motor, a movable member, means controlled by said movable member for actuating said speed controlling device and for determining the direction of its movement, means for actuating said movable member in accordance with the quantity of material delivered by said delivering device, and means operated independently of the quantity of material delivered to control the operation of said movable member by its actuating means.

16. In an apparatus of the character described, a material delivering device, a variable speed motor, means actuated by said motor to control the delivery of material by said delivering device, a movable member, means controlled by said movable member to control the speed at which said motor is operated, means for actuating said movable member in accordance with the quantity of material delivered by said delivering means, and means operated independently of the quantity of material delivered to control the operation of said movable member by its actuating means.

17. In an apparatus of the character described, a material delivering device, a variable speed motor, means actuated by said motor to control the delivery of material by said delivering device, a rheostat to control the speed of said motor, a movable member, means controlled by said movable member to actuate said rheostat, means for actuating said movable member in accordance with the quantity of material delivered by said delivering device, and means operated independently of the quantity of material delivered to control the operation of said movable member by its actuating means.

18. In an apparatus of the character described, a material delivering device, a variable speed motor, means actuated by said motor to control the delivery of material by said delivering device, a rheostat to control the speed of said motor, a reversible motor to actuate said rheostat, a movable member, means for actuating said movable member in accordance with the quantity of material delivered by said delivering device, means operated independently of the quantity of material delivered to control the operation of said movable member by its actuating means, and switches connected in circuit with said reversible motor and controlled by said movable member to determine the direction of operation of said reversible motor.

19. In an apparatus of the character described, a material delivering device, a variable speed motor, means actuated by said motor to control the delivery of material by said delivering device, a rheostat to control the speed of said motor, electrically operated means to actuate said rheostat in either direction and comprising two circuits, a movable member, means actuated by said movable member to close one of said circuits when said movable member moves in one direction and to close the other of said circuits when said movable member moves in the other direction, means for actuating said movable member in accordance with the quantity of material delivered by said delivering device, and separately operated means for controlling the movement of said movable member by its actuating means.

20. In an apparatus of the character described, weighing mechanism comprising a beam and adjustable means for counterbalancing said beam, a container supported by said weighing mechanism and having an operable part to control the delivery of material thereby, a motor to actuate said operable part, means to control the speed at which said operable part is operated by said motor, means separate from said weighing mechanism to adjust said counterbalancing means, and means controlled by said beam to control said speed controlling means.

21. In an apparatus of the character described, a material delivering device having an operable part to control the delivery of material thereby, means to actuate said operable part, means for varying the operation of said operable part by said actuating means to control the amount of material delivered, a movable member, means for actuating said movable member in accordance with the quantity of material delivered by said delivering device, a second member movable with relation to said movable member, separate means for actuating said second movable member, and means controlled jointly by said movable members for controlling the operation of the means which controls the opertion of said operable part.

22. In an apparatus of the character described, a material delivering device having an operable part to control the delivery of material thereby, means for actuating said operable part, a device movable in one direction to so vary the operation of said operable part by said actuating means as to increase the amount of material delivered and movable in another direction to so vary the operation of said operable part by said actuating means as to decrease the amount of material delivered, a movable member, means for actuating said movable member in accordance with the quantity of material delivered by said delivering device, a second member movable with relation to said movable member, separate means for actuating said second movable member, and means controlled by the joint action of said movable members for initiating and controlling the direction of the movement of said device for varying the operation of said operable part.

23. In an apparatus of the character described, a material delivering device having an operable part to control the delivery of material thereby, means for actuating said operable part, means including a reversible motor for varying the operation of said operable part by said actuating means, a movable member, means for actuating said movable member in accordance with the quantity of material delivered by said delivery device, a second member movable with relation to said movable member, separate means for actuating said second movable member, and a circuit controlling device for said reversible motor controlled by the joint action of said movable members.

24. In an apparatus of the character described, a material delivering device having an operable part to control the delivery of material thereby, means for actuating said operable part, means including a reversible motor for varying the operation of said operable part by said actuating means, a movable member, means for actuating said movable member in accordance with the quantity of material delivered by said delivery device, a second member movable with relation to said movable member, separate means for actuating said second movable member, a circuit controlling device for said reversible motor controlled by the joint action of said movable members, and means controlled independently of said movable members for intermittently closing and opening the circuit for said reversible motor.

25. In an apparatus of the character described, a material delivering device having an operable part to control the delivery of material thereby, means for actuating said operable part, means including a reversible motor for varying the operation of said operable part of said actuating means, said motor having separate circuits to cause it to operate in different directions, a movable member, means for actuating said movable member in accordance with the quantity of material delivered by said delivering device, a second member movable with relation to said movable member, separate means for actuating said second movable member, switches interposed in the respective circuits for said reversible motor and controlled by the joint action of said movable members, a switch connected in both of said circuits, and means operated independently of said movable members to open and close the last mentioned switch intermittently.

26. In an apparatus of the character described, a material delivering device having an operable part to control the delivery of material thereby, means for actuating said operable part, means for varying the amount of movement imparted to said operable part by said actuating means, a movable member, means for actuating said movable member in accordance with the quantity of material delivered by said delivering device, a second member movable with relation to said movable member, separate means for actuating said second movable member, and means controlled by the joint action of said movable members for controlling the operation of said means for varying the amount of movement imparted to said operable part.

27. In an apparatus of the character described, a material delivering device having an operable part to control the delivery of material thereby, a motor for actuating said operable part, a driving connection between said motor and said operable part which is adjustable to vary the operation of said operable part by said motor, a movable member, means for actuating said movable member in accordance with the quantity of material delivered by said delivering device, a second member movable with relation to said movable member, separate means for actuating said second movable member, and means controlled by the joint action of said movable members for adjusting the connection between said motor and said operable part.

28. In an apparatus of the character described, weighing mechanism comprising a beam and an adjustable counterbalance therefor, means independent of said weighing mechanism for adjusting said counterbalance, a container supported by said weighing mechanism, a pivoted device to control the discharge of material from said container, means for actuating said pivoted device, means for varying the amount of movement imparted to said pivoted device by its actuating means, and means controlled by the movement of said beam to actuate the means for varying the amount of movement imparted to said operable device.

29. In an apparatus of the character described, weighing mechanism comprising a beam and an adjustable counterbalance therefor, a container supported by said weighing mechanism, a pivoted device to control the discharge of material from said container, a rock arm connected with said pivoted device, a second rock arm, a normally stationary support for said second rock arm which is adjustable with relation to the first mentioned rock arm, a link connecting said rock arms, means for imparting oscillatory movement to said second rock arm, means separate from said weighing mechanism to adjust said counterbalance, and means controlled by the movement of said beam to adjust the support for said second rock arm.

30. In an apparatus of the character described, weighing mechanism comprising a beam and an adjustable counterbalance therefor, a container supported by said weighing mechanism, a pivoted device to control the discharge of material from said container, a rock arm connected with said pivoted device, a supporting member mounted for movement transversely to the axis of said pivoted device, a reversible motor for imparting movement to said supporting member, a second rock arm carried by said supporting member, a link connecting said rock arms, a constant speed motor, means actuated by said constant speed motor for imparting oscillatory movement to said second rock arm, means separate from said weighing mechanism to adjust said counterbalance, and means controlled by the movement of said beam to initiate and control the direction of the operation of said reversible motor.

31. In an apparatus of the character described, weighing mechanism comprising a beam and a poise supported by said beam for movement lengthwise thereof, a container supported by said weighing mechanism, an operable device to control the discharge of material from said container, power operated means for actuating said operable device, means separate from said weighing mechanism to impart predetermined movements to said poise at regular intervals, and means controlled by the movement of said beam to control the operation of said operable device by said power operated means.

32. In an apparatus of the character described, weighing mechanism comprising a beam and a poise supported by said beam for movement lengthwise thereof, a container supported by said weighing mechanism, an operable device to control the discharge of material from said container, power operated means for actuating said operable device, means separate from said weighing mechanism to impart predetermined movements to said poise at regular intervals, adjustable means to vary the extent of each movement of said poise, and means controlled by the movement of said beam to control the operation of said operable device by said actuating means.

33. In an apparatus of the character described, weighing mechanism comprising a beam and a poise supported by said beam for movement lengthwise thereof, a container supported by said weighing mechanism, an operable device to control the discharge of material from said container, power operated means for actuating said operable device, means for actuating said poise comprising a movable member connected with said poise, an oscillatory member, a one-way clutch for connecting said oscillatory member with said movable member, a motor, and means actuated by said motor to impart movement to said oscillatory member, and means controlled by the movement of said beam to control the operation of said operable device by said actuating means.

34. In an apparatus of the character described, weighing mechanism comprising a beam and a poise supported by said beam for movement lengthwise thereof, a container supported by said weighing mechanism, an operable device to control the discharge of material from said container, power operated means for actuating said operable device, means for actuating said poise comprising a rotatable member connected with said poise, a rock arm, means including a one-way clutch to connect said rock arm with said rotatable member, a motor, a pivoted arm, means actuated by said motor to impart oscillatory movement to said pivoted arm, a link to connect said pivoted arm to said rock arm, means to adjust said link toward and from the axis of said pivoted arm, and means controlled by the movement of said beam to control the operation of said operable device by said actuating means.

JAMES M. MONTGOMERY.